United States Patent [19]

Ahlberg

[11] Patent Number: 4,673,190
[45] Date of Patent: Jun. 16, 1987

[54] PROTECTIVE BAR ASSEMBLY FOR MOTORCYCLE

[76] Inventor: Russell W. Ahlberg, 2759 Leonard St., N.W., Grand Rapids, Mich. 49504

[21] Appl. No.: 795,515

[22] Filed: Nov. 6, 1985

Related U.S. Application Data

[63] Continuation-in-part of Ser. No. 655,053, Sep. 27, 1984, abandoned.

[51] Int. Cl.⁴ .............................................. B62J 27/00
[52] U.S. Cl. ................................ 280/289 G; 180/219; 280/289 A; 280/290; 280/756; 280/801; 296/102; 297/DIG. 9
[58] Field of Search .................... 180/219; 280/289 R, 280/289 L, 289 G, 289 E, 289 S, 290, 202, 801, 748, 755, 756; 293/126, 127; 296/102; 297/195, DIG. 9

[56] References Cited

U.S. PATENT DOCUMENTS

| | | | |
|---|---|---|---|
| 1,473,956 | 11/1923 | Eyre et al. | 280/289 G |
| 3,853,351 | 12/1974 | Lassiter | 297/DIG. 9 |
| 4,412,595 | 11/1983 | Kinzel | 296/102 X |
| 4,416,465 | 11/1983 | Winiecki | 280/289 E X |
| 4,560,196 | 12/1985 | Carter | 296/102 |

FOREIGN PATENT DOCUMENTS

| | | | |
|---|---|---|---|
| 270783 | 1/1930 | Italy | 180/219 |
| 2061088 | 5/1981 | United Kingdom | 280/290 |

Primary Examiner—John J. Love
Assistant Examiner—Charles R. Watts
Attorney, Agent, or Firm—John A. Waters

[57] ABSTRACT

A protective bar assembly for a motorcycle comprising a side bar assembly that extends along the side of the motorcycle and operator and a vertical, U-shaped roll bar that extends upwardly from the side bars to a point above the operator. The side bars are mounted on transverse front and rear bars mounted on the frame, with the rear bar being mounted behind the seat and above the rear wheel. A vertically movable headrest is mounted on the roll bar and a storage container is removably mounted on the back of the roll bar.

25 Claims, 17 Drawing Figures

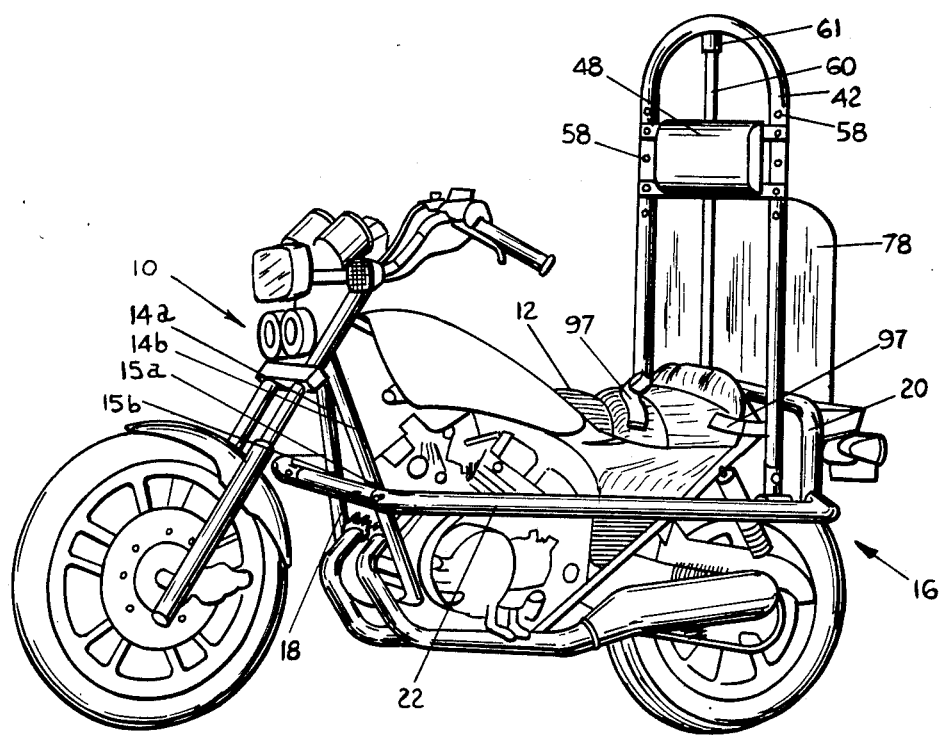
FIG. 1
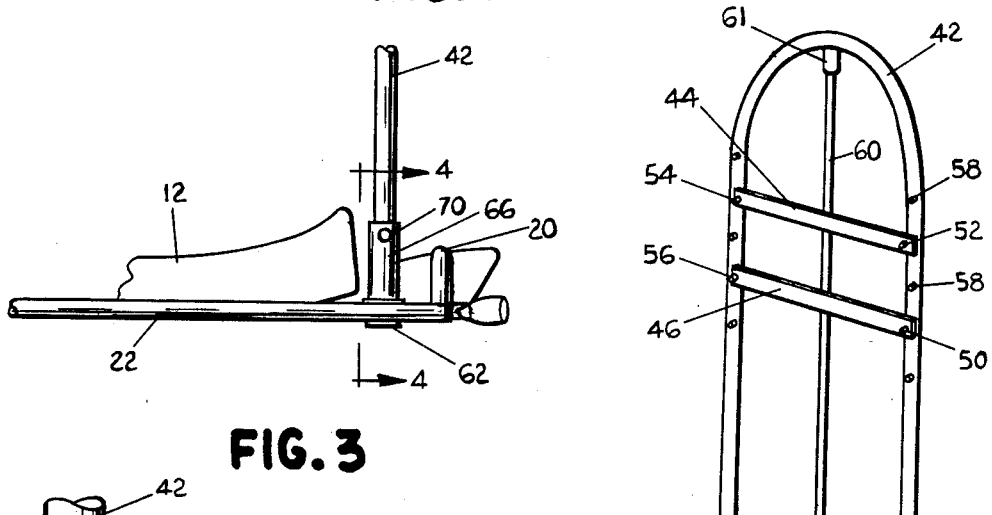
FIG. 3
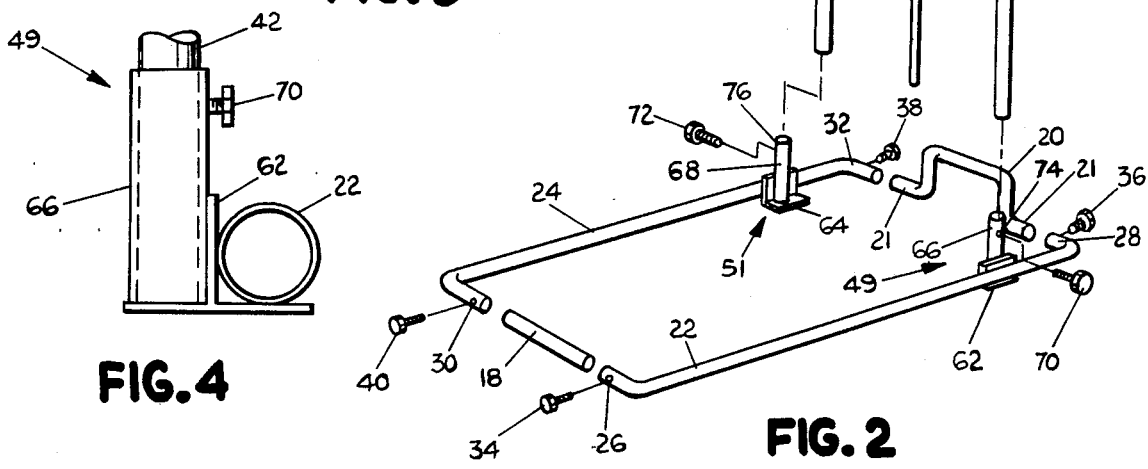
FIG. 4
FIG. 2

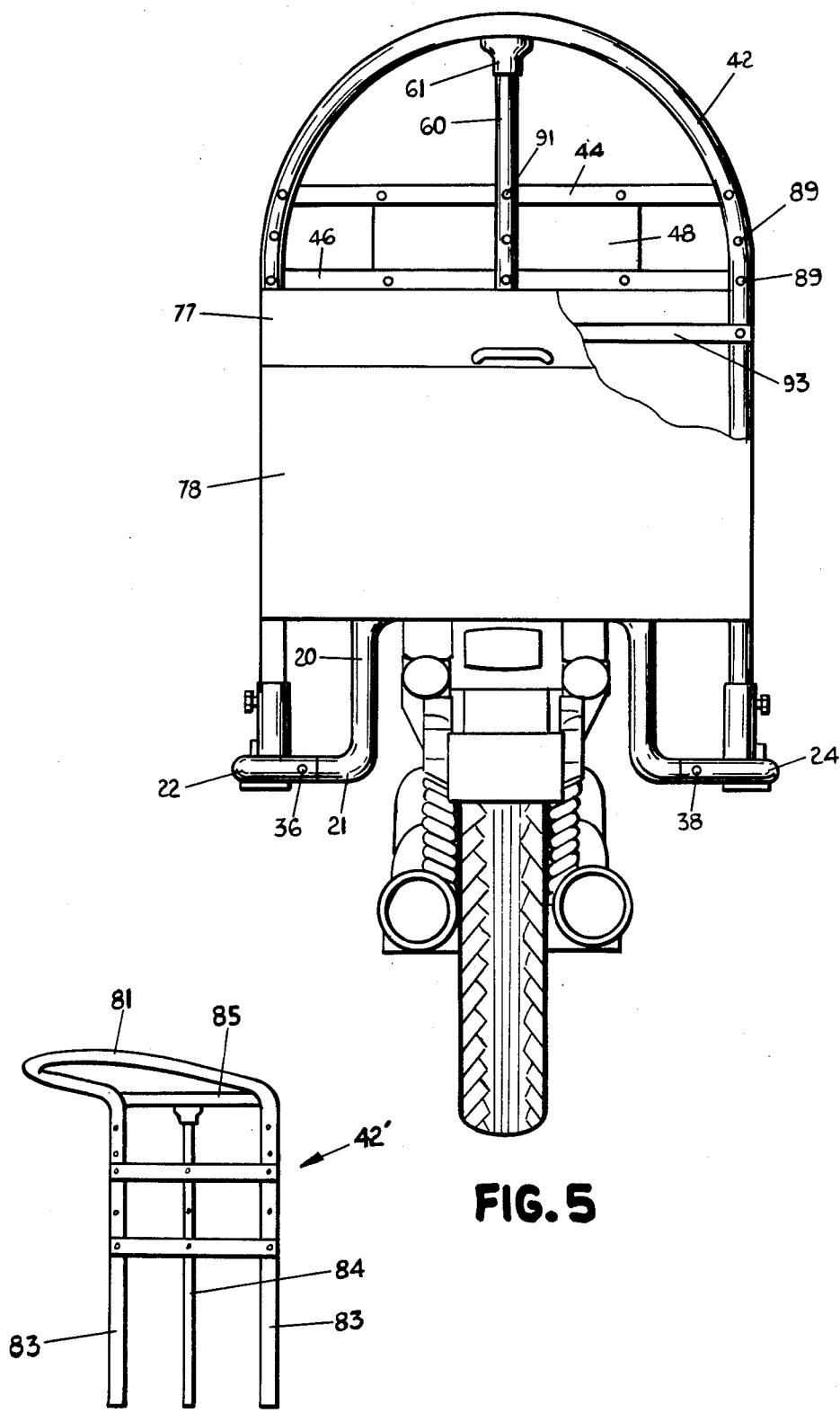

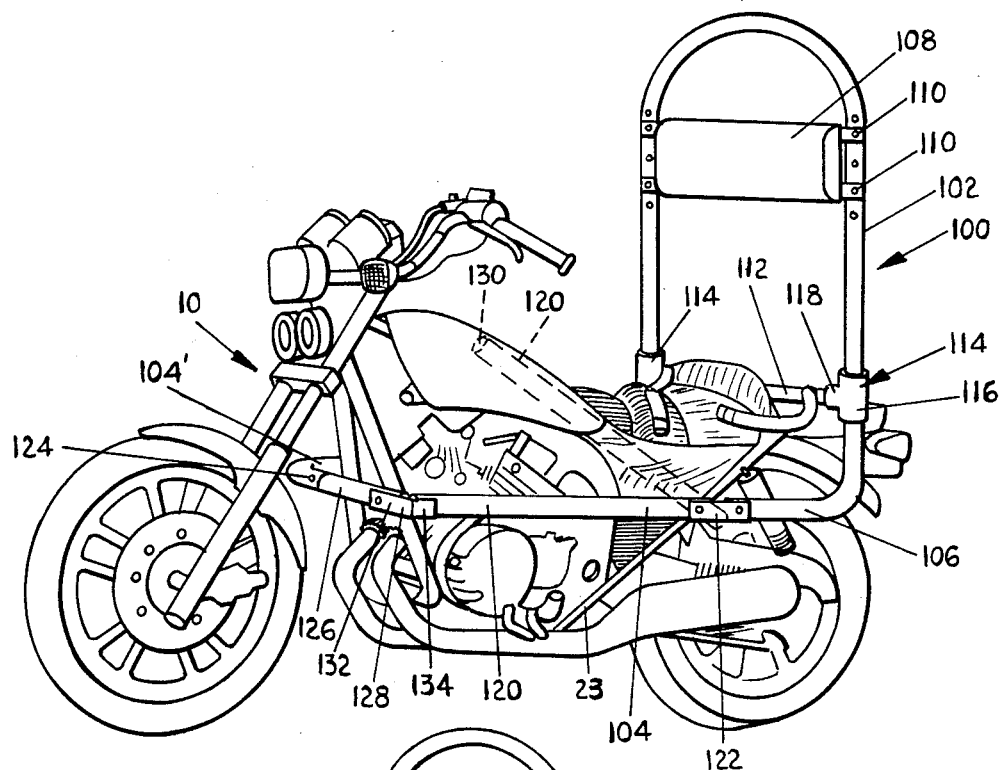
FIG. 7
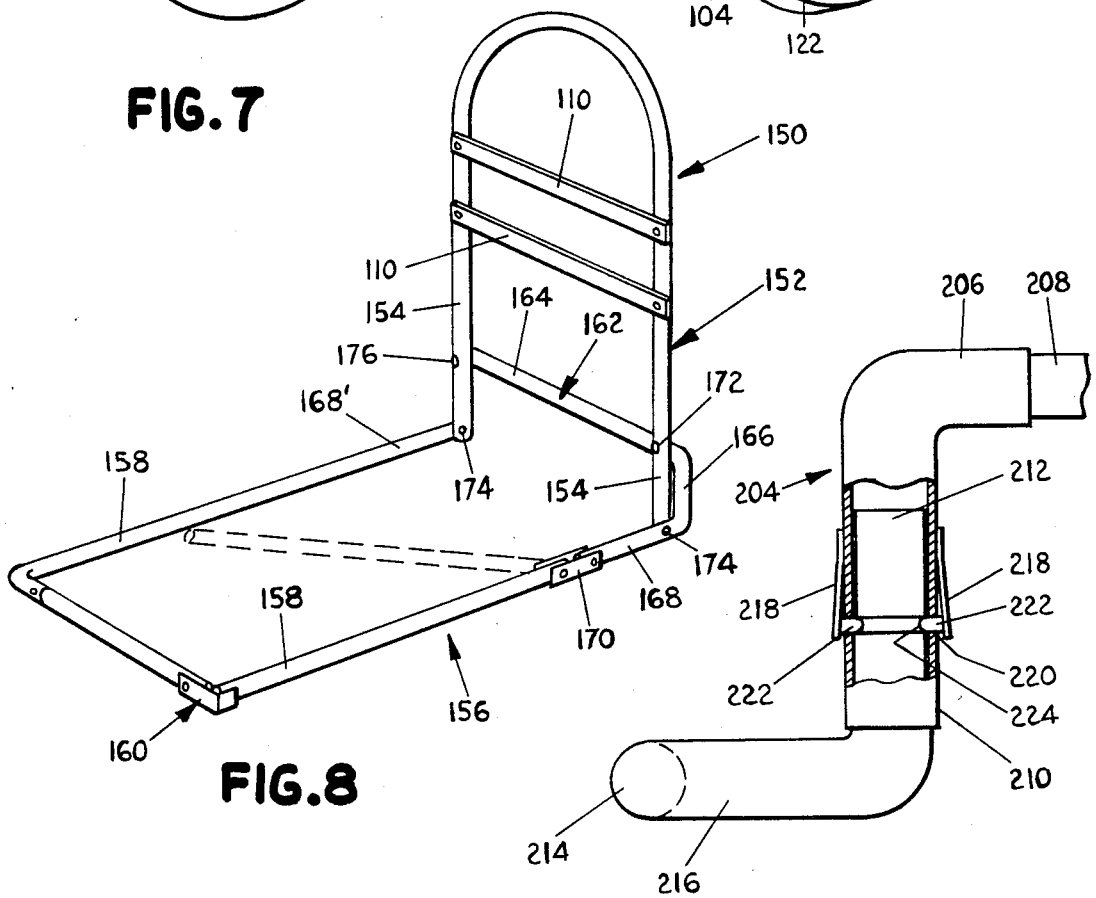
FIG. 8
FIG. 10

PROTECTIVE BAR ASSEMBLY FOR MOTORCYCLE

CROSS REFERENCE TO RELATED APPLICATION

This application is a continuation in part of applicant's co-pending application, Ser. No. 655,053, filed Sept. 27, 1984 now abandoned.

BACKGROUND OF THE INVENTION

This invention relates in general to motorcycles, and more particularly to an easily detachable protective means for motorcycle operators.

Motorcycles are well known to be hazardous vehicles. Having only two wheels, they are not as stable as vehicles with four wheels. Also, the motorcycle does not have an outside body and consequently offers no protection to the rider in a collision or fall.

In the past, protective cages or shells have been designed to fit over a motorcycle, thereby encompassing the motorcycle rider and offering some type of protection. However, these devices are bulky and heavy, thereby tending to impede and restrict the motorcycle driver and impair the performance of the motorcycle. Also, these protective devices are either permanently attached to the motorcycle or are attached in such a manner that they are not easily removable. Thus, they cannot be easily removed or varied according to the particular use of the motorcycle at any given time.

SUMMARY OF THE INVENTION

It is the primary object of this invention to provide a protective means for motorcycle riders without interfering with the comfort or operation of the motorcycle. A resilient, light-weight tubing is used to provide a roll bar and side protection bar for the motorcycle rider. The roll bar and side bar are easily detachable from the motorcycle. Thus, the protective assembly can be easily and quickly removed or attached to the motorcycle according to the desires of the motorcycle driver.

It is a further object of this invention to provide a headrest situated on the roll bar which can be easily adjusted in height according to the size of the motorcycle driver.

Still another object of the invention is to provide a storage container which also can be easily removed from the protective bar assembly.

These and other features and advantages of the present invention are shown in the appended drawings and described in detail in connection with the description of a preferred embodiment set forth below.

BRIEF DESCRIPTION OF THE DRAWINGS

FIG. 1 is a side elevation of a motorcycle having the protective bar assembly attached.

FIG. 2 is an exploded view of the protective bar assembly.

FIG. 3 is a detailed sectional view of the roll bar mounting means.

FIG. 4 is a detailed sectional view of the roll bar mounting means, taken on line 4—4 in FIG. 3.

FIG. 5 is a rear elevational view of the protective bar assembly showing the storage container in place.

FIG. 6 is a perspective view of a second embodiment of the roll bar of the present invention.

FIG. 7 is a perspective view of a motorcycle employing a third embodiment of the present invention.

FIG. 8 is a perspective view of a fourth embodiment of the present invention.

FIG. 10 is an enlarged view of the side bar connector of the embodiment shown in FIG. 9.

DETAILED DESCRIPTION OF THE PREFERRED EMBODIMENT

Figure 9:
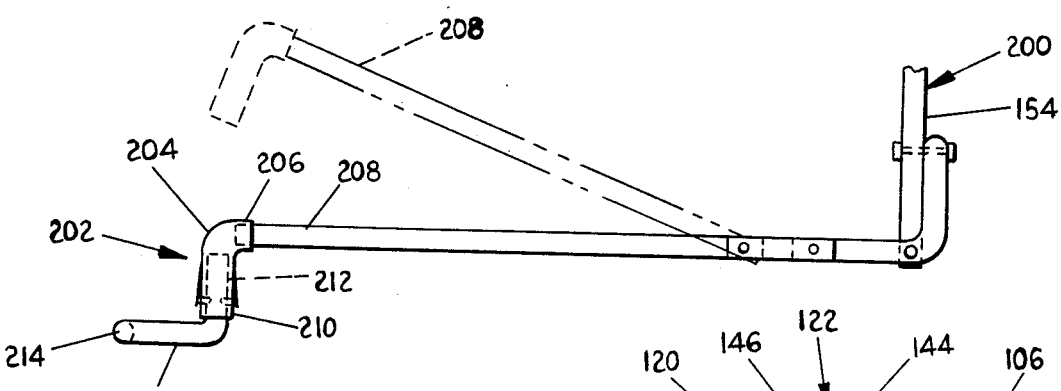
FIG. 9 is a partial side elevational view of a fifth embodiment of the present invention.

Referring now to the drawings in detail, a motorcycle 10 includes a seat 12 for the driver and rider, and front frame members 14a, 14b. The motorcycle can be of any type or size.

The protective bar assembly, generally designated as 16, is attached to the motorcycle 10. The tubular members of the bar assembly 16 are resilient and lightweight, and may be formed from any suitable material, such as steel or aluminum. The tubular members are of any suitable diameter and may be adapted to fit any particular motorcycle.

A transverse tubular front bar member 18 is permanently affixed to frame members 14a, 14b by means of welds 15a, 15b. Alternatively, a horizontal cross bar could be welded between frame members 14a and 14b, and the front bar member could be welded to this bar for its entire length. This could strengthen the mounting system. A transverse tubular back bar member 20 is permanently affixed to the frame or rear portion of the motorcycle 10 behind the seat by welding or other suitable means. The back bar member is shaped to accommodate the configuration of the particular motorcycles to which the protective device is mounted. In the preferred embodiment shown, back bar member is a downwardly facing U-shaped member with outwardly extending ends 21 on the lower ends thereof. The ends of the back bar are at the same level as the front bar so the side bars will be horizontal, the bars being positioned so that the side bars are protectively positioned at about the height of the knees of the rider.

Tubular side bar members 22, 24 run from the front bar member 18 to the back bar member 20 and have their respective ends curved inwardly. The diameters of the side bar members 22, 24 or the outer ends thereof are slightly larger (or smaller) than the diameter of front bar member 18 and ends 21 on the back bar member 20, such that the inwardly curved portions of the side bar members 22, 24 slidingly fit over (or inside) the respective ends of the front bar member 18 and back bar member 20. Threaded apertures 26, 28, 30, 32 are formed on the inwardly curving portions of side bar members 22, 24. When the side bar members 22, 24 are slidingly placed on front bar member 18 and back bar member 20, side bar members 22, 24 are secured in place by tightening releasable fasteners in the form of set screws 34, 36, 38, 40 which are threaded through apertures 26, 28, 30, 32, respectively. The set screws can bear against the outer surfaces of the bar members or they can fit through mating openings formed in the bar members. The openings in the bar members can be threaded. Thus, side bar members 22, 24 can be easily attached to or removed from the motorcycle merely by turning four set screws.

A tubular, inverted U-shaped vertical roll bar 42 extends upwardly from the side bar members 22, 24. The height of the roll bar 42 is substantially greater than a motorcycle rider positioned on the motorcycle. Rigid cross members 44, 46 are attached to the roll bar 42. A padded headrest 48 is permanently attached to cross members 44, 46. In the preferred embodiment, cross members 44, 46 are removably attached to roll bar 42 by means of screws 50, 52, 54, 56, which threadably engage four of a series of vertically spaced threaded apertures 58 in the roll bar, according to the height desired. Thus, the headrest 48 can be adjusted vertically along the roll bar 42 to accommodate motorcycle riders of different heights. A tubular vertical stabilizing bar 60 extends downwardly to the motorcycle from a socket bracket 61 on roll bar 42 halfway between the sides of the roll bar for structural strength.

The roll bar is releasable mounted on the side bars by means of vertical socket fittings 49, 51 attached to the side bars. Socket fittings 49, 51 attached to the side bars. Socket fittings 49, 51 comprise T-shaped flanges 62, 64 welded to the side bar members 22, 24, and tubular sleeves 66, 68 welded to the respective vertical and outwardly extending horizontal portions of flanges 62, 64. The diameter of the sleeves 66, 68 is slightly larger than the diameter of roll bar 42, such that roll bar 42 slidingly fits into the sleeves 66, 68. For stability purposes, the length of the portion of the roll bar 42 that slidingly fits in the sleeves 66, 68, is several times the diameter of roll bar 42. Roll bar 42 is secured in sleeves 66, 68 by tightening set screws 70, 72 which are threaded through apertures 74, 76 in sleeves 66, 68, respectively. These set screws can bear against the sides of the roll bar or they can fit in mating openings (threaded or non-threaded) formed in the roll bar.

A modified roll bar 42' is shown in FIG. 6. In this embodiment, the upper end 81 of the roll bar extends forwardly from vertical uprights 83 at a 90° angle so as to extend directly over the head of the motorcycle operator, providing added protection. A cross bar 85 extends between the upper ends of upright 83, and a stabilizing bar 84 extends upwardly to cross bar 85.

Desirably a storage container 78 is attached to the roll bar 42 by any suitable means, such as by hooks or threaded fasteners that engage openings 89 in the roll bar openings 91 in the vertical stabilizing bar 60. A cross bar 93 can be mounted on the back of the frame for suspending the storage container or for hanging other types of storage devices such as bags or the like. The storage container can be a fabric container with a zipper closure or can be a hard plastic container with a hinged cover 77 or any other suitable container configuration.

An additional protection, a seat belt 97 can be attached to the frame or roll bar for holding the motorcycle operator on the seat in an accident.

A third embodiment 100 of the present invention is shown in FIG. 7. This embodiment also includes a roll bar 102 and protective side bars 104 on the sides of the motorcycle. Roll bar 102 is a tubular inverted U-shaped roll bar having lower ends 106 that extend forwardly at right angles with respect to the roll bar to form part of the side bar. A head rest 108 of the same type as described before is attached at selected spaced openings in the roll bar by means of rigid cross members 110. The roll bar is attached to the frame of the motorcycle and at a point behind the seat and above the rear wheel, at the same general position as the other embodiments. This is accomplished by means of a cross member or rear bar 112 extending between the U-shaped legs of the roll bar. The cross member is welded or bolted to the frame and is attached to the roll bar by T-shaped socket fittings 114 having a tubular vertical section 116 that fits over the roll bar and an inwardly facing tubular section 118 that receives the ends of cross member 112. Socket fitting 114 is bolted to the roll bar, and the cross member is bolted in the socket fitting.

The side bar on at least one side of the motorcycle comprises a raisable or pivotable section 120 pivotally mounted at the end of member 106 by means of a hinge mechanism 122 pivotably connecting the adjacent ends of member 106 and section 120. The raisable section 120 can be raised in the manner shown in phantom in FIG. 7 in order to permit the rider to get on the motorcycle. The hinge could permit the side bar to pivot outwardly as an alternative.

The other side bar 104' on the opposite side of the motorcycle can also have a raisable section. Alternatively, if only one raisable section is desired, the side bar can be a solid horizontal member extending forwardly from the end of section 106 and can be integrally formed therewith out of the same tubular section.

The forward end of side bar 104' is an inwardly curved portion 124. This is connected to a transverse front bar 126 that it is welded or bolted to the front frame of the motorcycle in the manner described above. A bracket and latch mechanism is attached to the outer end of the front bar where the raisable section is located. This bracket and latch mechanism receives and releasably holds in place the front end 130 of the raisable section of the side bar.

Figure 12:
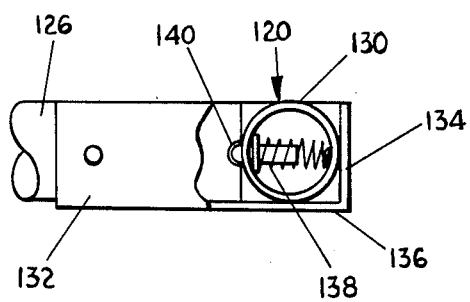
FIG. 12 is an enlarged and partially broken front view of the side bar latch of the embodiments shown in FIGS. 7 and 8.

Bracket mechanism 128 in FIGS. 7 and 12 comprises a right angle channel member having a front plate 132 attached at right angles to a bottom plate 136. An end plate 134 extends at right angles from the outer edges of the front and bottom plates. Each plate 134 fits over the outer side of end 130 of the side bar.

As shown in FIG. 12, side bar end 130 fits snugly between plate 134 and the end of cross member 126, with the end of the section abutting front plate 132 and resting on plate 136. A spring mounted latch member 138 extends through an opening in the inner side of end 130 and fits in a recess 140 in the end of front member 126. The latch mechanism holds the side bar in place at the end of the front bar. The bar still can be released by either a manual release or by a sharp upward pull on the side bar in order to permit the rider to mount the motorcycle. With the end of the side bar being positioned adjacent at the end of the front bar, an inward striking force exerted against the side bar would be resisted by the end of the front bar.

Figure 11:
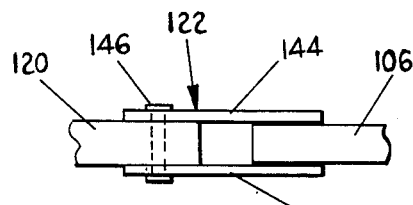
FIG. 11 is an enlarged view of the side bar hinge of the embodiments shown in FIGS. 7, 8, and 9.

The structure of the hinge mechanism 122 is shown in FIG. 11. The ends of stationary section 106 and movable section 120 are positioned adjacent to each other but spaced apart enough to permit pivotal movement of one with respect to the other. A pair of flat plates 144 are welded on opposite sides of the end of section 106 and span the end of section 120. A bolt 146 extends between the plates and through the end of section 120 and permits pivotal movement of section 120 between the plates.

A fourth embodiment 150 of the present invention is shown in FIG. 8. Many aspects of this embodiment are the same as the embodiment of FIG. 7 and will not be described again. For those components that are the same, the same reference numerals will be used.

Protective bar 150 comprises an inverted U-shaped roll bar 152 having parallel downwardly extending legs 154. A head rest, not shown, is attached to rigid cross members 110 of the same type as described above. A side protective bar mechanism 156 includes an upwardly movable or pivotable section 158 of the same type described above and a fixed side 158', again the same type as described above. A latch mechanism 160 is the same type as described above as well.

The side bar members are attached to the cross bar by means of a tubular section 162 comprising a transverse rear bar 164 integrally formed with downwardly extending vertical members 166 at the ends thereof and forwardly extending sections 168 at the bottoms of the downwardly extending sections. Section 168 on the side of the movable side bar member is attached to the side bar member by means of a hinge 170. Section 168' on the opposite of the protective bar assembly is integrally formed with side bar member 158' such that side bar 158' extends rearwardly, upwardly, then across as member 164 and then downwardly and forwardly as sections 166 and 168. Transverse rear bar 164 is attached to the frame of the motorcycle behind the seat and above the wheel in the same manner as described above for transverse member 112.

The roll bar is attached to the side protective bar by means of a pair of bolts for each leg of the roll bar, with an upper bolt 172 bolting the leg of the roll bar to cross member 164 at each end thereof. A lower bolt 174 attaches at the end of each leg 174 to section 168 of the bar assembly. The two bolt members provide increased structural rigidity of the interconnection between the roll bar and the side bar members in minimized torsional forces that would be applied to a single point of attachment.

A modified version of the protective bar assembly of FIG. 8 is shown as embodiment 200 in FIG. 9. The rear portion of the protective bar assembly is the same as in FIG. 8, the only difference being the bracket or connector mechanism and latch mechanism employed at the front of the bar assembly. In this embodiment, a connector 202 comprises a right angle tubular member 204 having an upper leg 206 that fits on the end 208 of the side bar. A vertical leg 210 fits on an upwardly extending end 212 of front bar 214. Front bar 214 can have a rearwardly extending portion 216 interconnecting the front bar, which is attached to the frame, with upwardly extending portion 212.

As shown in more detail in FIG. 10, the right angle tubular member is releasably attached to the upwardly extending portion of the front bar mechanism 214 by means of spring mounted latches 218 that protrude through openings 220 in opposite sides of the right angle section, with projections 222 on the latches fitting into grooved recesses 224 in upwardly extending section 212 in order to lock the movable side bar section to the front bar assembly. The latches can either be releasable by a sharp upward force on the side bar or, if desired, they can be releasable only when the spring mounted detents are manually released.

Figure 13:
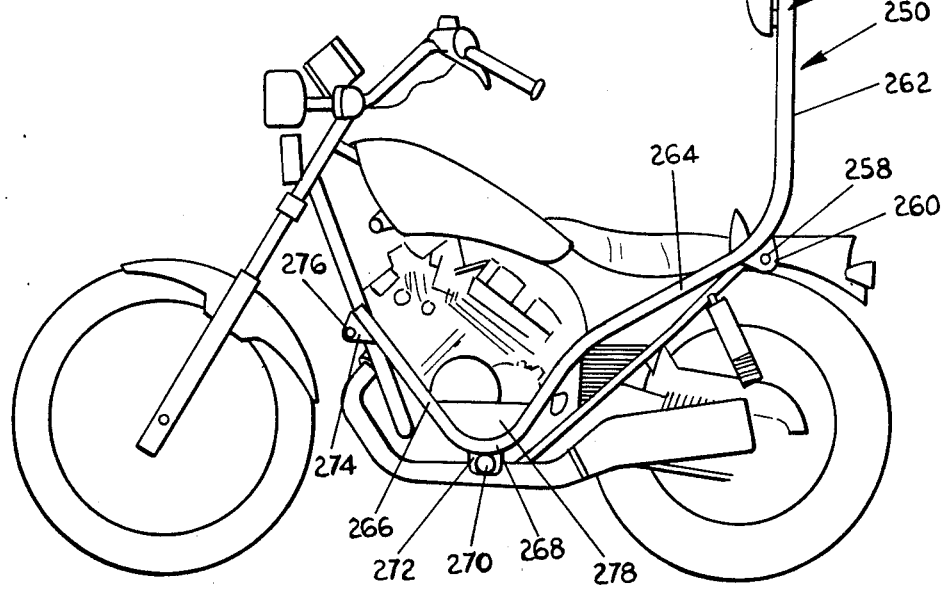
FIG. 13 is a side elevational view of a motorcycle employing a sixth embodiment of the present invention.
Figure 14:
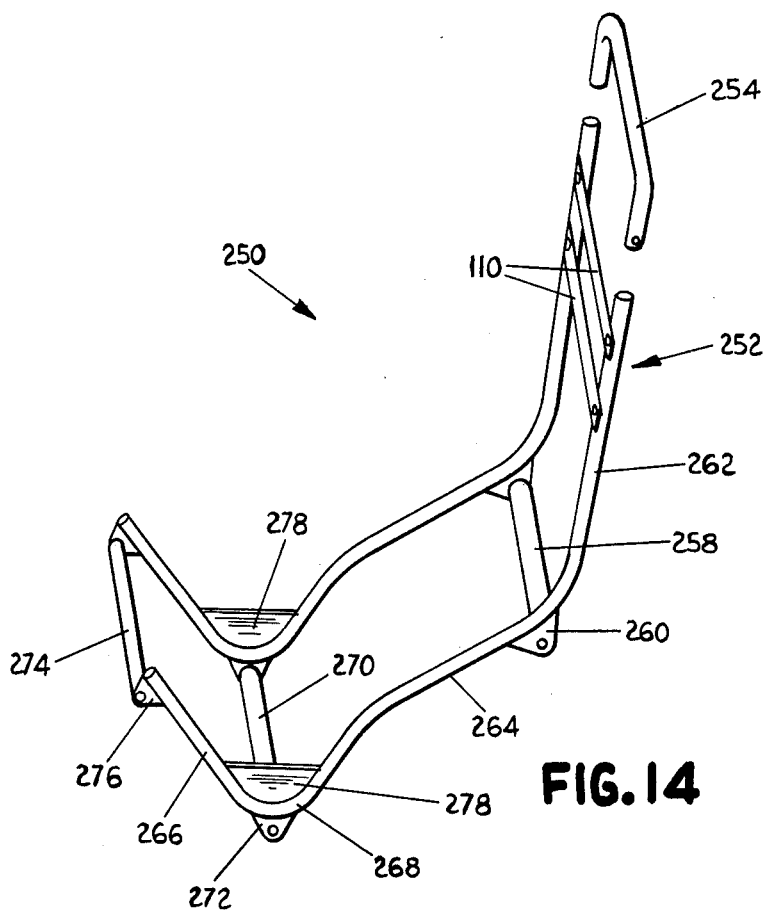
FIG. 14 is a perspective view of the protective bar assembly of FIG. 13.

A sixth embodiment 250 of the present invention is shown in FIGS. 13 and 14. In this embodiment, the sides of the side bar and roll bar member are integrally formed as single side members 252 out of a continuous curved section of tubular stock. These sides members are parallel and are interconnected by a U-shaped top 254 of the roll bar by a bolt connection 256. The protective bar mechanism is attached to the rear of the motorcycle by means of a rear cross bar 258 attached to the frame at the rear of the seat and above the wheel, as in previous embodiments. The ends of the cross bars 258 are attached to the side members 252 by means of plate flanges 260 welded to each side member. Cross member 258 can be bolted to the flanges 260.

As shown in the drawings, each side member 252 includes a vertical roll bar section 262 that curves forwardly and downwardly to a rear side bar section 264 at the point where the side member is attached to cross member 258. The rear section of the side bar 264 extends forwardly and downwardly to a position just behind the rider's foot position in the motorcycle and then curves downwardly to a lower end 268 adjacent the side of the foot rest. The side bar then curves upwardly in a forward section 266 to the front frame of the motorcycle. The bottom portion 268 positioned adjacent to the side of the foot rest. The side bar is attached to the under side of the frame of the motorcycle by means of a cross member 270 that runs underneath the motorcycle. Cross member 270 is attached to bottom section 268 by means of a flange 272 welded to each of the bottom sections. The front portion 266 is attached to the frame of the motorcycle by means of a cross member 274, which is attached at its ends to flanges 276 welded to the ends of the side members. Protective side plates 278 can be attached to the side bars at their lower sections 268 so as to extend between front and rear sections 266 and 264. The side plates can extend upwardly to protect the foot area of the rider.

With the protective bar assembly constructed in this manner, the bar assembly provides the same type of roll bar and side bar protection as in other embodiments but it facilitates the ease with which a rider may get on and off the motorcycle, without using a raisable side section. Another advantage of this construction is that all the components are bolted together and can be removed so that the roll bar assembly can be packaged flat as a kit. The cross members in such a case are bolted to the motorcycle, although it would be possible to weld the cross members to the motorcycle.

Figure 15:
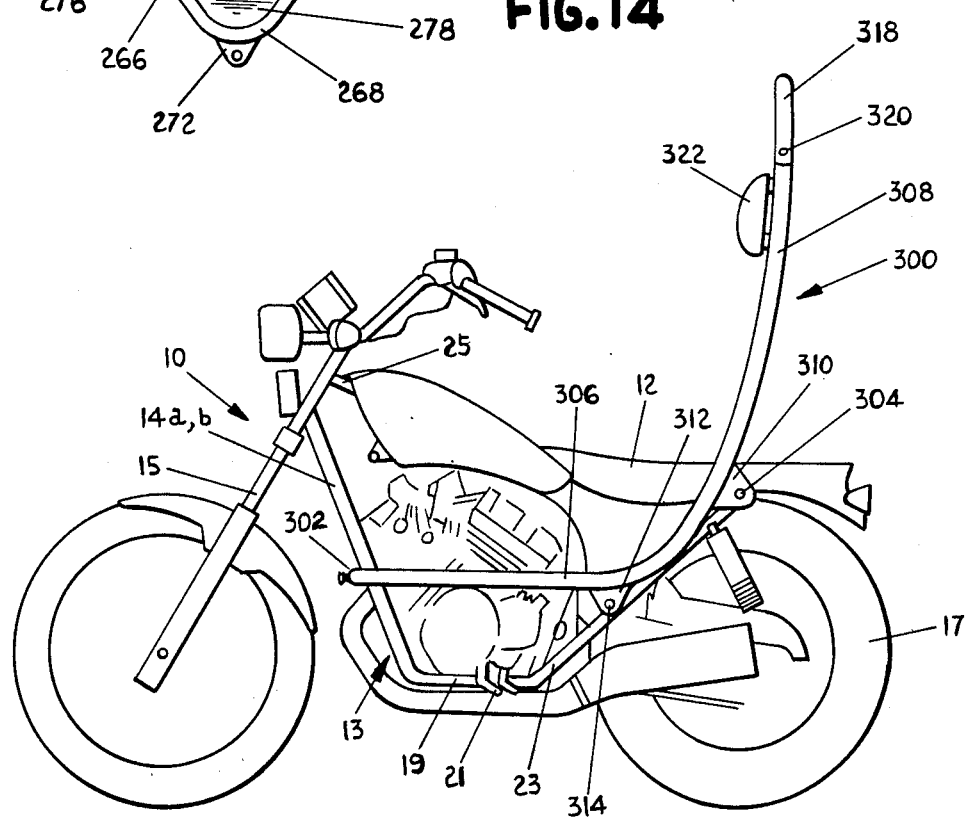
FIG. 15 is a side elevational view of a motorcycle employing a seventh embodiment of the present invention.

A fifth embodiment 300 of the present invention is shown in FIG. 15. The protective bar assembly still comprises a combination roll bar and side bar mechanism, with the mechanism being attached to the motorcycle by means of a front bar 302 attached to the front portion of the frame of the motorcycle and a rear bar 304 attached to the frame of the motorcycle behind the seat and above the wheel. In this embodiment, the side bar 306 is integrally formed with the side or leg portion 308 of the roll bar as a continuous section of tube, with the tube being curved at the junction between the side and roll bar portions. The roll bar is connected to the rear end of the motorcycle by means of rear cross bar 304, which is attached by bolts or the like to welded flanges 310 on the roll bars. Another flange 312 is formed at the rear end of the side bar, and a cross bar 314 extends between the flanges and is attached to the frame 23 of the motorcycle at an intermediate position along this rearwardly and upwardly extending portion of the frame.

For reference purposes, a motorcycle 10 typically includes a frame 13 that supports the seat 12 and connects a front fork 15 with the rear wheel 17. The frame includes downwardly and rearwardly extending front frame members 14a and 14b, a lower portion 19 that extends under and supports the engine adjacent a foot rest 21, and a rear portion 23 that extends upwardly and rearwardly to a position adjacent the rear of the seat above the rear wheel. The upper ends of the front and rear portions are connected by a support 25 that supports the seat.

The front portion 302 of the bar mechanism can be attached to the motorcycle by bolts or the like. The front portion can be separate or it can be formed as a continuous section of tubing, with both sides of the protective bar mechanism being formed by a single continuous section of tubing including the sides and front bar portion. Only a U-shaped cap portion 318 is necessary to complete this structure, with a cap portion being connected by bolts 320 to the upper ends of roll bar members 308. A head rest 322 of the same design as described above is attached to the roll bar mechanism.

In this embodiment, side bar 306 is horizontally disposed at the height of a conventional car bumper so as to maximize sideways protection for the rider. The added protection is achieved at some sacrifice in the ease with which a rider may get on and off the motorcycle, when compared with the embodiment of FIGS. 13 and 14. The embodiments of FIGS. 13 and 14 can provide sideways protection for the rider even for bumpers of a substantially different height from the conventional automobile bumper, since the side protector bars are vertically inclined at the position of the rider's legs.

Figure 16:
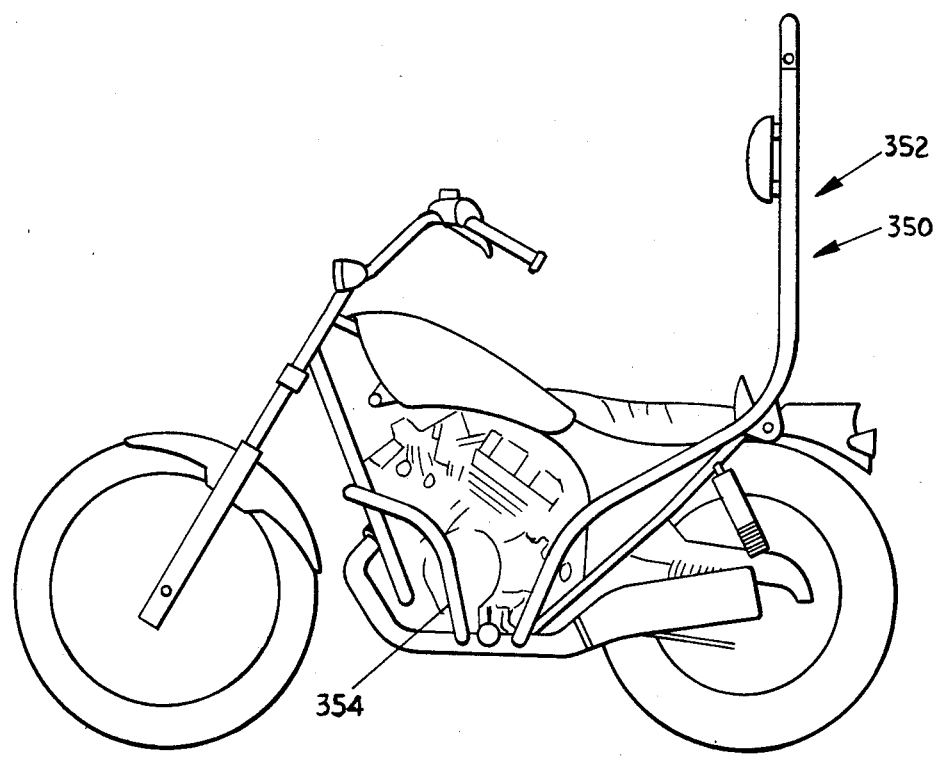
FIG. 16 is a side elevational view of a motorcycle employing an eighth embodiment of the present invention.
Figure 17:
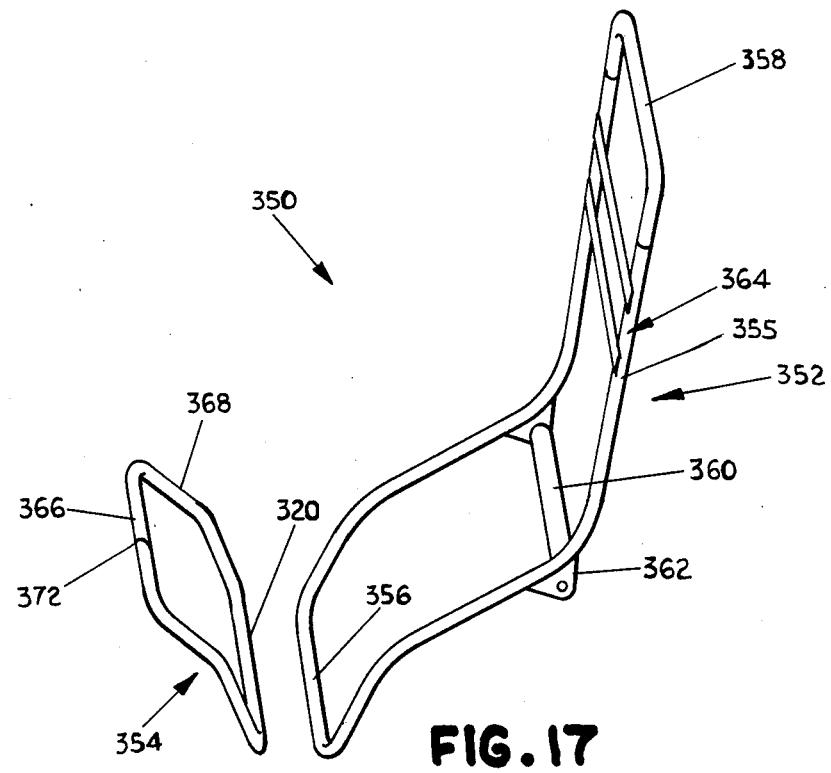
FIG. 17 is a perspective view of the protective bar assembly of FIG. 16.

A final embodiment of the present invention is shown in FIG. 16. This embodiment is substantially similar to the embodiment of FIG. 14, with the exception that the side bar protection is separated into two separate members. In embodiment 350, the protective bar mechanism comprises a rear section 352 and a front section 354. Rear section 352 includes the roll bar and the rear portion of the side protector bar assembly. Front section 354 includes the front bar and the front portion of the side protector bar assembly.

Rear section 352 includes parallel side members 355, a transverse bottom member 356, and a U-shaped cap 358 at the top, which interconnects the side members. An intermediate transverse section or rear bar 360 is attached to the side members 354 by flanges 362 and is in turn attached to the rear portion of the frame of the motorcycle behind the seat and above the wheel, in the same manner as the other embodiments described above. The shape of side members 355 is substantially the same as the shape of the protective bar shown in FIGS. 13 and 14 and includes a vertical roll bar section 364 that extends downwardly and then curves forwardly at the position of the transverse mounting member 360. The tubular member then extends downwardly and forwardly to protect the side of the rider and then curves more sharply downwardly adjacent to the foot rest in order to join bottom 356 that fits underneath the motorcycle. Section 356 is attached to the motorcycle by bolts or the like. Section 356 can be integrally formed with the sides of the rear portion of the protective bar assembly so as to form a single integral section of tubing.

Front section 354 comprises a front member 366 attached to the front portion of the frame of the motorcycle as in previous embodiments. Side portions 368 extend downwardly and rearwardly from the front section and then curve downwardly at a steeper angle to join a bottom member 370 that fits underneath the motorcycle adjacent to the foot rest and is attached to the frame at the point. To a large extent, this front section can be formed of a single section of tubing that is bent in the desired shape. This tubing can be joined at the ends 372 at any position, the ends being positioned at the middle of the front bar 366 in the illustrated embodiment.

With this embodiment, the rider has substantial freedom in getting on and off the motorcycle, yet the side of the rider is well protected.

Other variations, applications and ramifications of this invention will occur to those skilled in the art upon reading the present disclosure. All such modifications and variations are intended to be within the scope of the invention as defined in the appended claims.

The embodiments in which are exclusive property or privilege is claimed are defined as follows:

1. A protective bar assembly for a motorcycle having a frame, engine, seat, front wheel fork, rear wheel, and foot rests, the frame having a front portion attached to the front wheel fork and extending downwardly to a lower portion that supports the engine, a rear portion of the frame extending upwardly from the engine and having an upper portion adjacent to the rear of the seat and the top of the rear wheel of the motorcycle, the protective bar assembly comprising a front bar mounted transversely to the front portion of the frame and extending outwardly from the sides of the motorcycle, a rear bar being mounted transversely to the upper rear portion of the frame behind the motorcycle seat and above the rear wheel and extending outwardly from the sides of the motorcycle, the protective bar assembly further including a side bar attached to the front and rear bars on each side of the motorcycle, the side bars being shaped and positioned to protect the legs of a rider from impact with an automobile bumper colliding with the side of the motorcycle.

2. A protective bar assembly according to claim 1 wherein the front bar of the protective bar assembly is attached to the front portion of the frame at a point above the lower portion thereof, each side bar including a front portion attached to the front bar and extending rearwardly and downwardly therefrom and being attached to the frame at a lower portion which is adjacent the foot rest, the side bar including a rearward portion attached to the lower portion of the frame and extending upwardly and rearwardly to the rear portion of the frame, the downwardly and rearwardly and upwardly and rearwardly extending portions of the side bar serving to protect a rider's legs from bumpers at different heights.

3. A protective bar assembly according to claim 2 wherein the side bars are attached to the lower portion of the frame by at least one transverse lower cross member attached to and extending across the frame.

4. A protective bar assembly according to claim 1 and further comprising a roll bar portion including generally upright legs extending upwardly from the rear of each side bar and a top member extending between upper ends of the legs.

5. A protective bar assembly according to claim 4 wherein each side bar and corresponding leg of the roll bar constitute a continuous side member, with the side member being formed from a single section of tubular stock that is bent or formed so as to extend from the front bar to the rear bar and then upwardly to serve as the side members of the roll bar.

6. A protective bar assembly according to claim 5 wherein the front and rear bars comprise support bars that are attached at intermediate points to the frame and extend outwardly from the motorcycle to ends that are attached to the side members.

7. The protective bar assembly according to claim 1 wherein at least one side bar includes a pivotable section adjacent the side of the motorcycle that is pivotably connected in the protective bar assembly at one end thereof and is releasably connected to the protective bar assembly at the other end thereof, the pivotable section being pivotable out of the way to permit the rider to easily mount and dismount the motorcycle.

8. The protective bar assembly according to claim 7 wherein the pivotable section is constrained by a hinge joint at the rear of the pivotable section to pivot vertically, the front of the pivotable section including manually releasable latch means for releasable attachment of the front end of the pivotable section to the front bar.

9. The protective bar assembly according to claim 8 wherein the front of the pivotable section is connected to the front by an interfitting connection at the junction between the pivotable section and the front bar, the interfitting connection comprising a tubular forward end on the pivotable section that is shaped and positioned to interfit with the end of the front bar, the releasable latch means releasably holding the interfitting sections together.

10. The protective bar assembly according to claim 9 wherein at least one outer end of the front bar extends in an upward direction and the tubular end on the pivotable section extends downwardly so as to mate and interfit with the front bar when pivoted into engagement.

11. The protective bar assembly of claim 8 wherein a bracket is attached to the front bar and receives and positions the front end of the pivotable section outside of and in line with the outer end of the front bar, the manually releasable latch means releasably holding the pivotable section in the bracket when the pivotable section is closed, the end of the front bar thus resisting an inward impact on the pivotable section.

12. A protective bar assembly for protecting a motorcycle operator while riding on a motorcycle having front and rear wheels, a motorcycle seat, sides, and a frame with front and rear portions, with the rear portion of the frame extending behind the motorcycle seat and above the rear wheel, the protective bar assembly comprising:
   a side protection bar assembly extending around the sides of the motorcycle and operator, the assembly including transverse front and rear bar members attached respectively to front and rear portions of the motorcycle frame, the front bar members being attached to the motorcycle frame at least at a height of an automobile bumper, the rear bar member being attached to the motorcycle frame behind the motorcycle seat and above the rear wheel, the side protection bar assembly further comprising side bar members spaced outwardly from the sides of the motorcycle and supported between the front and rear bar members such that a motorcycle rider is protected from sideways contact with an automobile bumper; and
   a generally vertical, inverted U-shaped roll bar located behind the motorcycle operator, the roll bar having spaced upright legs and a top extending between upper ends of the legs, the legs having lower ends that rigidly join the side bar members.

13. A protective bar assembly according to claim 12, wherein the roll bar is attached to both the rear bar member and the side bar members at longitudinally separated locations along the roll bar.

14. The protective bar assembly according to claim 12 wherein a padded headrest is removably attached to the vertical roll bar.

15. The protective bar assembly according to claim 14 and further comprising attachment means for mounting the headrest to the vertical roll bar at a plurality of positions along the roll bar, the attachment means enabling the headrest to be moved upwardly or downwardly according to the height of the motorcycle operator.

16. The protective bar assembly according to claim 12 wherein the roll bar includes vertical upright members behind the motorcycle operator and an upper portion that extends forwardly from the upright members over the position of the head of the motorcycle operator.

17. The protective bar assembly according to claim 12 and further including a storage container removably attached to and located immediately behind the vertical roll bar.

18. The protective bar assembly according to claim 17 wherein the storage container is mounted to the back of the roll bar by removable fasteners that engage openings in the back side of the roll bar.

19. The protective bar assembly according to claim 12 and further comprising seat belt means anchored to the protective bar assembly for holding the motorcycle operator on the motorcycle seat.

20. A protective bar assembly for protecting a motorcycle operator while riding on a motorcycle having a frame and sides, the protective bar assembly and a motorcycle seat, comprising:
   a side protection bar assembly extending around the sides of the motorcycle and rider, the assembly including front and rear bar members fixed to the motorcycle frame and side bar members spaced outwardly from the side of the motorcycle and removably attached to the front and rear bar members by means of interfitting joints, releasable fasteners releasably locking the side bars to the front and rear bars;
   a generally vertical, inverted U-shaped roll bar attached by releasable fasteners to the side protective bar assembly and extending upwardly behind the motorcycle operator.

21. The protective bar assembly according to claim 20 wherein the motorcycle frame has a rear portion positioned behind the motorcycle seat and above a rear wheel of the motorcycle, the rear bar member being attached to the motorcycle frame behind the motorcycle seat and at a point higher than the front and side bar members, with outer ends of the rear bar members curving downwardly to ends positioned at the level of the front bar members, the ends being formed to fittingly engage the side bar members.

22. The protective bar assembly according to claim 20 wherein the vertical roll bar is removably attached to the side protection bar assembly by means of interfitting joints, releasable fasteners releasably locking the roll bar to the side protection bar assembly.

23. The protective bar assembly according to claim 22 wherein the interfitting joints for attaching the vertical roll bar to the side protection bar assembly comprises a pair of vertically oriented sleeves of slightly larger diameter than lower ends of the vertical roll bar, the sleeves being fixed to the side protection bar assembly and slidingly receiving the ends of the vertical roll bar therein, releasable fasteners locking the roll bar in the sleeves.

24. The protective bar assembly according to claim 23 wherein the sleeves are mounted to the side bar members.

25. The protective bar assembly according to claim 12 wherein the vertical roll bar also is removably attached to the rear bar member at a point spaced longitudinally away from the point of attachment to the side bar members.

* * * * *